United States Patent
Yoon et al.

(10) Patent No.: US 9,315,217 B2
(45) Date of Patent: Apr. 19, 2016

(54) PRODUCTION METHOD FOR A SPLASH SHIELD USING A CONTINUOUS EXTRUSION-INJECTION-FOAMING MOULDING PROCESS

(75) Inventors: Yong-Hoon Yoon, Daejeon (KR); Moo-Sun Kim, Seoul (KR); Kyu-Se Lee, Ulsan (KR); Young-Min Kim, Yangsan-si (KR); Byeong-Sang Mun, Cheonan-si (KR); Sung-Woon Cha, Goyang-si (KR); Young-Ho Kim, Seoul (KR); Soo-Hyun Cho, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 176 days.

(21) Appl. No.: 13/988,526

(22) PCT Filed: Nov. 28, 2011

(86) PCT No.: PCT/KR2011/009098
§ 371 (c)(1),
(2), (4) Date: May 21, 2013

(87) PCT Pub. No.: WO2012/070918
PCT Pub. Date: May 31, 2012

(65) Prior Publication Data
US 2013/0241188 A1    Sep. 19, 2013

(30) Foreign Application Priority Data

Nov. 26, 2010 (KR) .......................... 10-2010-0119154

(51) Int. Cl.
*B29C 44/04*  (2006.01)
*B62D 25/16*  (2006.01)
(Continued)

(52) U.S. Cl.
CPC .............. *B62D 25/161* (2013.01); *B29C 44/04* (2013.01); *B29C 44/0461* (2013.01);
(Continued)

(58) Field of Classification Search
CPC ........................................................ B29C 44/04
USPC ........................................................ 264/45.3
See application file for complete search history.

(56) References Cited

U.S. PATENT DOCUMENTS 4,731,401 A * 3/1988 Moteki et al. ................. 524/271
6,303,070 B1 * 10/2001 Bulters et al. ............... 264/328.7
(Continued)

FOREIGN PATENT DOCUMENTS

CN           1660561 A      8/2005
CN         101374646 A      2/2009
(Continued)

OTHER PUBLICATIONS

Japanese Office Action dated Jul. 22, 2014.
International Search Report mailed Jul. 2, 2012 for PCT/KR2011/009098.
Chinese Office Action dated Oct. 21, 2014.
Japanese Notice of Allowance dated Nov. 4, 2014.
European extended search report dated Jan. 22, 2015.

*Primary Examiner* — Christina Johnson
*Assistant Examiner* — Xue Liu
(74) *Attorney, Agent, or Firm* — Hauptman Ham, LLP

(57) ABSTRACT

The present invention relates to a method for producing a splash shield, in which method a base-portion raw material comprising a plastic, glass fibers, a compatibilizer and rubber is subjected to melt extrusion while at the same time injection molding is performed, and then, without removing the injection-molded article from the injection mold, the injection mold is rotated in the open state, and the injection-molded article is conveyed to a foaming mold and subsequently undergoes flame treatment and a polyurethane foam molding step. A single process in the production method is used for the procedure in which the materials are separately compounded and pelletized and the procedure in which the injection-molded article is molded.

3 Claims, 1 Drawing Sheet

(51) Int. Cl.
  *B29C 45/16* (2006.01)
  *B29C 44/08* (2006.01)
  *B29C 45/04* (2006.01)
  *B29L 31/30* (2006.01)
  *B29C 45/18* (2006.01)
  *B29K 105/04* (2006.01)
  *B29K 75/00* (2006.01)
  *B29K 105/12* (2006.01)

(52) U.S. Cl.
  CPC .............. *B29C 44/08* (2013.01); *B29C 45/162* (2013.01); *B29C 45/045* (2013.01); *B29C 45/1816* (2013.01); *B29C 2045/1692* (2013.01); *B29K 2075/00* (2013.01); *B29K 2105/04* (2013.01); *B29K 2105/12* (2013.01); *B29K 2995/0002* (2013.01); *B29L 2031/3005* (2013.01)

(56) References Cited

U.S. PATENT DOCUMENTS

| | | |
|---|---|---|
| 2005/0186413 A1 | 8/2005 | Niesner et al. |
| 2010/0047520 A1 | 2/2010 | Drube et al. |
| 2010/0178488 A1* | 7/2010 | Yasuda et al. ............... 428/304.4 |

FOREIGN PATENT DOCUMENTS

| | | |
|---|---|---|
| DE | 19944351 C1 | 7/2001 |
| DE | 102005027374 A1 | 1/2007 |
| DE | 102006021021 A1 | 11/2007 |
| JP | 07195414 A | 8/1995 |
| JP | 09254168 | 9/1997 |
| JP | 2000185327 | 7/2000 |
| JP | 2005231211 A | 9/2005 |
| JP | 2006502888 A | 1/2006 |
| JP | 2010076163 A | 4/2010 |
| KR | 1020000036736 | 7/2000 |
| KR | 1020060104110 | 10/2006 |

\* cited by examiner

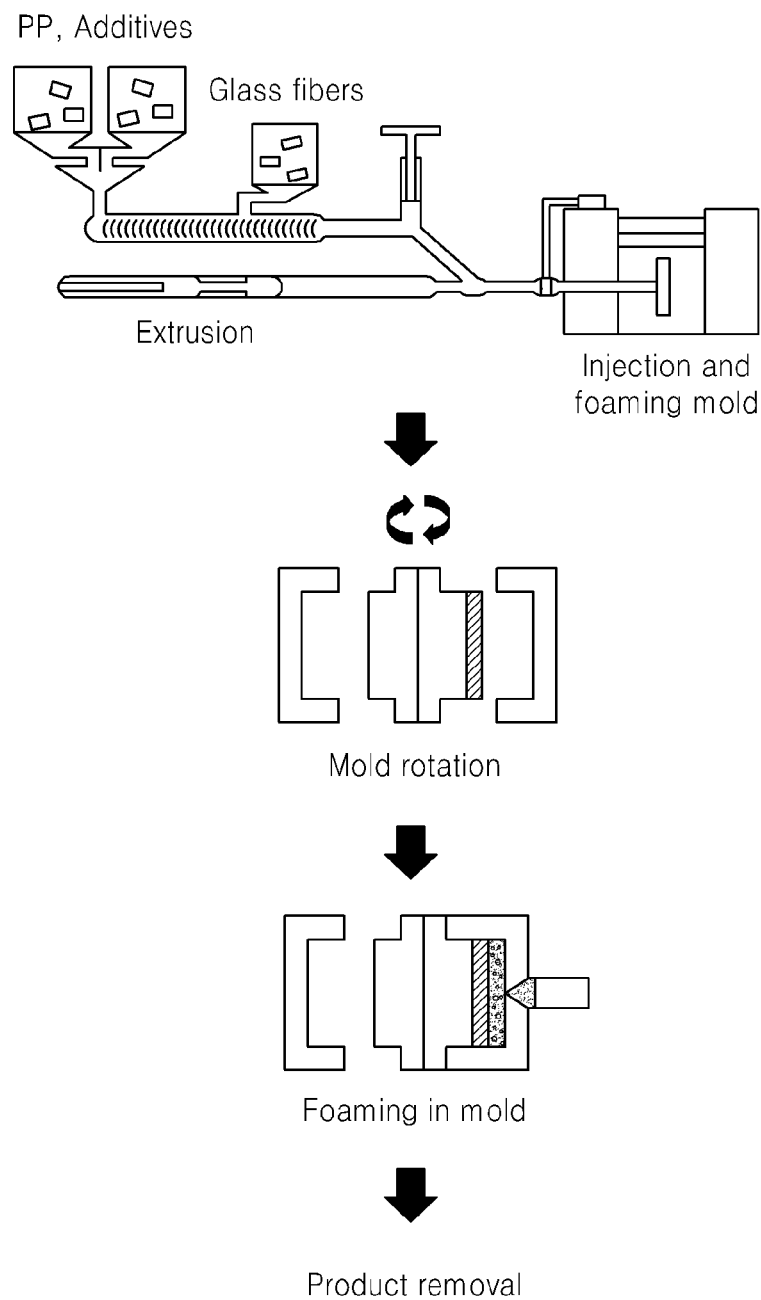

PRODUCTION METHOD FOR A SPLASH SHIELD USING A CONTINUOUS EXTRUSION-INJECTION-FOAMING MOULDING PROCESS

CROSS REFERENCE TO RELATED APPLICATION

This application claims the priority of Korean Patent Application No. 10-2010-0119154, filed on Nov. 26, 2010 in the KIPO (Korean Intellectual Property Office). Further, this application is the National Phase application of International Application No. PCT/KR2011/009098 filed Nov. 28, 2011, which designates the United States and was published in Korean.

TECHNICAL FIELD

The present invention relates to a method of producing a splash shield for protection of a vehicle body and noise reduction, in which a sound-absorbing foamed structure is attached to a base of the splash shield comprising glass fibers by a continuous extrusion-injection-foaming process.

BACKGROUND ART

A splash shield is generally mounted under an engine to block engine noise. Such a splash shield has a structure wherein a sound-absorption material such as polyurethane foam is deposited to a certain thickness on one side of a base thereof formed of synthetic resins such as plastic materials.

A conventional method of producing a splash shield includes compounding a resin, injection-molding the resin to form a base, foaming a sound-absorption material, attaching the sound-absorption foam to the base, and subsequent post-treatment processes. However, such a method is not efficient in terms of process configuration since the method requires separate fabrication of the base and the sound-absorption structure and attachment using adhesives.

Further, although attachment of the base and the sound-absorption structure has been performed using adhesives, the use of the adhesives becomes difficult as the structure of the splash shield becomes complicated and the adhesives are disadvantageous in terms of physical performance of the splash shield.

To solve these problems, studies have been conducted to fabricate a splash shield in which a base is integrally formed with a sound-absorption structure. As an attempt to accomplish this object, a base material containing a foaming resin and a sound-absorption material are sequentially stacked in a mold and hot-pressed while foaming and curing the foaming resin contained in the base material. In another method, a surface layer is formed on a base, which has been subjected to injection molding or press molding, by vacuum molding, and a foaming resin is then injected and foamed between the base and the surface layer. However, since the respective processes are performed separately, these methods have problems in that the number of processes is high, processes are complex, and a long process time is required in manufacture of the splash shied. Further, press molding causes decrease in the degree of freedom of product shapes.

DISCLOSURE

Technical Problem

With continuous studies to develop a technique for fabricating a splash shield in a single molding process so as to satisfy desired physical properties, the inventors of the present invention developed a splash shield, in which a sound-absorbing foamed structure is integrally attached to a hybrid material base mainly comprised of plastic material and glass fibers, through a continuous-injection-foaming molding process. Therefore, an aspect of the present invention is to provide a method of fabricating a splash shield having excellent physical properties through a simple molding process.

Technical Solution

In accordance with one aspect of the present invention, a method of fabricating a splash shield using a continuous extrusion-injection-foaming process includes: introducing raw materials for a base comprising a plastic material, glass fibers, a compatibilizer and rubber into an extruder and extruding a resin mixture by melting and mixing the raw materials; conveying the extruded resin mixture in a molten state and injection-molding the extruded resin mixture; rotating the injection mold in an open state without removing the injection-molded article from an injection mold and conveying the injection-molded article to a foaming mold; performing flame treatment on the resin mixture in the foaming mold; and foaming polyurethane on a surface of the flame-treated resin mixture, with the foaming mold closed.

Advantageous Effects

With the method of fabricating a splash shield according to the present invention, the procedure of separately compounding and pelletizing materials and the procedure of injection-molding an article and forming a foamed body are performed through a single process, so that a time for conveying materials and various components is shortened, thereby reducing risks, such as dimensional error of molded products, denaturing and contamination in the conveying procedure, and the like. Further, the fabricated splash shield does not require a separate adhesive detrimental to physical properties of the splash shield, so that it has superior mechanical strength and sound-absorption performance to existing splash shields.

DESCRIPTION OF DRAWINGS

FIG. 1 is a schematic diagram of a process of fabricating a sound-absorption structure-integrated glass fiber-reinforced splash shield through a continuous extrusion-injection-foaming process.

BEST MODE

Now, embodiments of the present invention will be described in detail.

The present invention relates to a method of fabricating a splash shield through a single process, in which raw materials for a base are subjected to melt extrusion and injection-molding, and the injection-molded article is conveyed to a foaming mold without removing the injection-molded article from an injection mold and subjected to foaming of a sound-absorption structure in a foaming mold.

First, raw materials for the base comprising a plastic material, glass fibers, a compatibilizer and rubber are introduced into an extruder and subjected to melting and mixing to form a resin mixture, followed by extrusion of the resin mixture. The plastic material may be any material so long as it can be used for the base of the splash shield. Preferably, the plastic material is polypropylene. The plastic material may be present in an amount of 60 wt % to 80 wt % of the raw material for the base. Here, if the amount of the plastic material is less than 60 wt %, the amount of the glass fibers increases relatively, causing increase in specific gravity, whereas if the amount of the plastic material exceeds 80 wt %, there can be a problem of deterioration in mechanical properties of the splash shield.

The glass fibers are used to improve the mechanical properties of the base of the splash shield. The amount of the glass fibers may range from 15 wt % to 30 wt % in the base material. Here, if the amount of the glass fibers is less than 15 wt %, the specific gravity of the base materials can be lowered, but the base can suffer from deterioration in mechanical properties such as strength or durability. If the amount of the glass fibers exceeds 30 wt %, there can be a problem of increase in specific gravity. Further, the compatibilizer is used for facilitating mixing of the raw materials and stabilization thereof during mixing. A polypropylene compatibilizer such as CM-1120W (available from Honam Petrochemical Co., Ltd.) may be used as the compatibilizer. The amount of the compatibilizer may range from 1 wt % to 5 wt %. Here, if the amount of the compatibilizer is less than 1 wt %, the compatibilizer does not provide substantial effects, and if the amount of the compatibilizer is above 5 wt %, the compatibilizer does not provide actual effects according to increase in the amount thereof, while deteriorating the physical properties of the base. Thus, it is desirable that the compatibilizer be present in the above range. Further, the rubber is used to improve impact strength of the base. Specifically, the rubber may include a polyolefin elastomer (available from Dow Chemical Company). The rubber may be present in an amount of 3 wt % to 8 wt % in the base material. If the amount of the rubber is less than 3 wt %, it is difficult to obtain desired impact strength, and if the amount of the rubber exceeds 8 wt %, there can be deterioration in tensile strength, bending strength, and flexural modulus. The base material may further include coloring additives or the like, if necessary.

Extrusion is a compounding process of melting and mixing materials. Advantageously, the plastic material, the compatibilizer, the rubber and the additives are introduced into an extruder through a hopper, and the glass fibers are introduced, in the form of uncut filaments, directly into a cylinder of the extruder at a point passing the middle of the cylinder. Separate introduction of the glass fibers prevents the glass fibers from being excessively cut, thereby allowing the glass fibers to be maintained at a length of 2 mm or more in the base.

In the cylinder, the continuously compounded resin is conveyed in a molten state to an injection mold along a conveying path in the proximity of a nozzle. Upon injection molding, the resin mixture may be metered corresponding to the weight of the base of the splash shield and then introduced into the mold. If the mold cannot receive the molten resin during injection molding after metering the resin, the compounded resin is temporarily stored in another cylinder and is conveyed in the next metering stage, thereby allowing the process to be continuously performed.

After completion of injection molding, the injection-molded resin is conveyed to a foaming mold without being removed from the injection mold, by rotating the injection mold in an open state. The injection mold is configured such that a rotatable core portion, called a lower mold, positioned between an injector and a foam nozzle can be rotated about an upper mold having a gate through which the resin mixture is injected and an upper mold having a gate through which a foaming material is introduced, thereby allowing the mold to be sequentially opened or closed. After the base is injection-molded through the injection gate, the lower mold is turned toward the foaming gate in order to convey the injection-molded resin mixture to the foaming mold.

Then, the resin mixture is subjected to flame treatment in the foaming mold. The flame treatment lowers surface tension of the injection-molded resin mixture so that a foamed part, that is, the sound-absorption structure, can be attached to the base without using an adhesive. Flame treatment is performed in such a manner that, when the lower mold having the injected-molded base placed therein is turned toward the upper mold of the foaming machine, a portion of the base to which the sound-absorption material will be attached is subjected to flame treatment using, for example, a robot equipped with a flame ejector outside the injector and the foaming machine.

Next, with the foaming mold closed, the flame-treated resin mixture is subjected to a foaming process to form polyurethane foam on the surface of the resin mixture, thereby fabricating a splash shield. Here, the polyurethane foam forms a sound-absorption structure, which in turn is attached to the base that is the injection-molded resin mixture. Foaming pressure may range from 150 bars to 200 bars. If the foaming pressure is less than 150 bars, a problem such as degradation in foaming performance can occur due to unbalanced mixture of polyols and isocyanates, i.e. foaming materials, and if the foaming pressure exceeds 200 bars, there can be problems such as reduced process efficiency and increased fabrication costs.

According to the present invention, the splash shield may be fabricated through a single continuous extrusion-injection-foaming process, thereby improving process efficiency, and the fabricated splash shield does not contain adhesives, thereby providing excellent physical properties as compared with products fabricated by conventional methods.

Mode for Invention

Now, the present invention will be described in more detail with reference to examples. However, it should be understood that the present invention is not limited to the following examples.

INDUSTRIAL APPLICABILITY

Examples

Example 1

72 wt % of polypropylene, 3 wt % of a compatibilizer (CM-1120W, Honam Petrochemical Co., Ltd.), and 5 wt % of polyolefin elastomer (Dow Chemical Company) were introduced into an extruder through a hopper, and glass fibers were introduced into a cylinder of the extruder at a point passing 60% of the length of the cylinder in an extrusion direction. The resin mixture was extruded at a cylinder temperature of 210° C. for melting the base materials, and at a screw speed of 150 rpm.

The extruded resin mixture was subjected to injection molding by injecting the molten resin mixture at an injection rate of 50 mm/s into an injection mold through an injection gate, and the injection mold was rotated in an open state toward a foaming gate, without removing the injection-molded resin mixture from the injection mold.

Next, the injection-molded resin mixture was subjected to flame treatment using a robot equipped with a flame ejector, and then, polyurethane was injected at 160 bars, with the foaming mold closed, thereby fabricating a splash shield in which polyurethane foam, i.e. a sound-absorption structure, was applied to the injection-molded base.

Example 2

A splash shield was fabricated in the same manner as Example 1, except that 67 wt % of polypropylene and 25 wt % of glass fibers were used.

Evaluation of Physical Properties

1) Flexural Modulus

The test was performed according to ASTM D790. Here, a sample had a size of 127 mm×12.7 mm×6.4 mm, and an injection speed was 5 mm/min.

2) Impact Strength

The test was performed according to *ASTM D256. Here, a sample was a notched sample having a size of 63.5 mm×12.7 mm×6.4 mm. The impact test was conducted at room temperature (25° C.) and a low temperature (−30° C.), respectively.

3) Running Noise Test

The test was performed on a 1991 cc, 1995 kg midsize vehicle having a 4-cylinder direct-injection type diesel engine to which the splash shield of Example 1 was attached, according to an ISO-362 test method.

4) Odor Test

The test was performed at 80° C. according to MS 300-34 standards.

TABLE 1

| Item | | Example 1 | Example 2 |
|---|---|---|---|
| Flexural modulus | | 2.63~3.00 GPa | 2.91~3.26 GPa |
| Impact | 25° C. | 19~21 kJ/m2 | 20~23 kJ/m2 |
| Strength | −30° C. | 15~17 kJ/m2 | 18~23 kJ/m2 |
| Running Noise | | 75 dB or less | 75 dB or less |
| Odor | | Grade 2 | Grade 2 |

Table 1 shows test results on physical properties of the splash shields fabricated in Examples 1 and 2. As shown in Table 1, the splash shield of Example 2, containing a relatively large amount of glass fibers in the base thereof, showed excellent results in terms of flexural modulus and impact strength. However, both Examples 1 and 2 had a high flexural modulus of more than 2.63 GPa, which is similar to or slightly higher than that of splash shields in the art. Further, Examples 1 and 2 also had a high impact strength of more than 19 KJ/m$^2$. The splash shied of the examples has low temperature impact strength similar to that of splash shields in the art. Further, since running noise and odor testing results satisfied desired physical properties for vehicles, it could be seen that the method according to the present invention may provide a splash shield, which has superior mechanical strength and sound-absorption performance to products fabricated by a conventional method, through a single process.

The invention claimed is:

1. A method of fabricating a splash shield using a continuous extrusion-injection-foaming process, comprising:
   introducing raw materials for a base comprising a plastic material, glass fibers, a compatibilizer, and rubber comprising a polyolefin elastomer, into an extruder and extruding a resin mixture by melting and mixing the raw materials;
   conveying the extruded resin mixture in a molten state and injection-molding the extruded resin mixture;
   rotating the injection mold in an open state without removing an injection-molded resin mixture from an injection mold and conveying the injection-molded resin mixture to a foaming mold;
   performing flame treatment on the resin mixture in the foaming mold; and
   foaming polyurethane on a surface of the flame-treated resin mixture, with the foaming mold closed;
   wherein the raw materials for the base comprise about 60 to about 80 wt % of the plastic material, about 15 to about 30 wt % of the glass fibers, about 1 to about 5 wt % of the compatibilizer, and about 3 to about 8 wt % of the rubber.

2. The method according to claim 1, wherein the plastic material comprises polypropylene.

3. The method according to claim 1, wherein the glass fibers are introduced into a cylinder of said extruder at a point passing the middle of the cylinder.

* * * * *